United States Patent [19]
Mirtain

[11] 3,834,439
[45] Sept. 10, 1974

[54] ASYMMETRIC PNEUMATIC VEHICLE TIRE

[75] Inventor: Henri J. Mirtain, Compiegne, France

[73] Assignee: Uniroyal S.A., Clairoix, France

[22] Filed: Jan. 26, 1973

[21] Appl. No.: 326,635

[30] Foreign Application Priority Data
Feb. 2, 1972  France .............................. 72.03478

[52] U.S. Cl. .......................................... 152/361 FP
[51] Int. Cl. .............................................. B60c 9/18
[58] Field of Search.... 152/361 DM, 361 FP, 361 R

[56] References Cited
UNITED STATES PATENTS
3,623,529  11/1971  Fausti............................ 152/361 FP
3,738,408  6/1973  Rach et al..................... 152/361 FP FOREIGN PATENTS OR APPLICATIONS
1,435,170  3/1966  France .......................... 152/361 FP

*Primary Examiner*—M. Henson Wood, Jr.
*Assistant Examiner*—Robert Saifer
*Attorney, Agent, or Firm*—Herbert Stern, Esq.

[57] ABSTRACT

An asymmetric pneumatic vehicle tire is disclosed. The tire includes a carcass, a tread overlying the crown region of the carcass and a tread reinforcing band positioned between the tread and the crown region. The reinforcing band circumferentially surrounds the carcass and includes a rubberized sheet of parallel ply cords which is folded at its sides to provide a first transversely continuous circumferential layer and a second circumferential layer formed by first and second portions and having a circumferential zone of discontinuity. The reinforcing band further includes a circumferential ribbon of rubberized parallel ply cords which is positioned adjacent to the sheet of cords and in the zone of discontinuity. The zone of discontinuity and the ribbon are so positioned that the midpoint between the axis of the zone of discontinuity and the axis of the ribbon is offset from the median equatorial plane of the tire, thereby providing the desired asymmetric tire.

The foregoing abstract is neither intended to define the invention disclosed in this specification, nor is it intended to be limiting as to the scope of the invention in any way.

11 Claims, 15 Drawing Figures

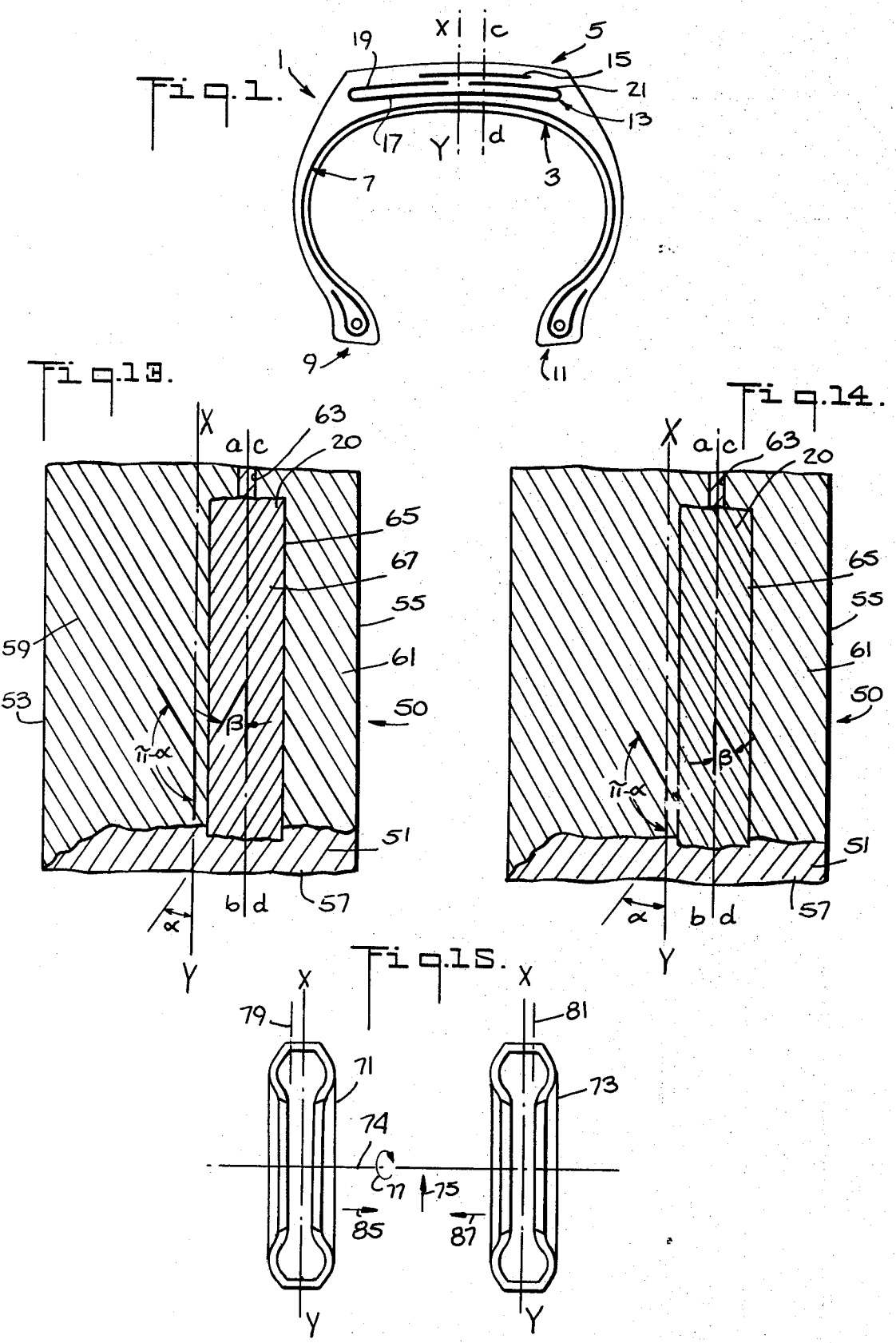

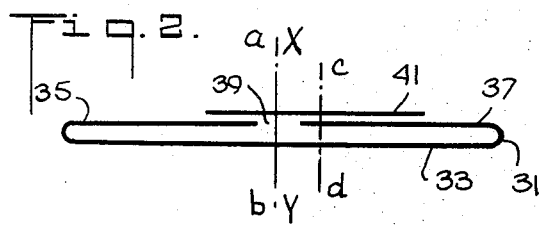
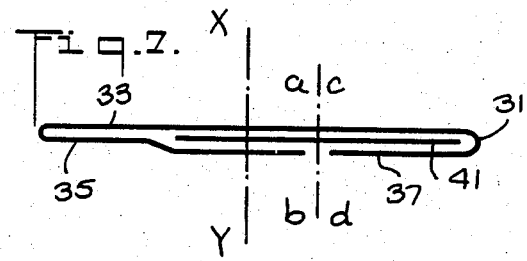
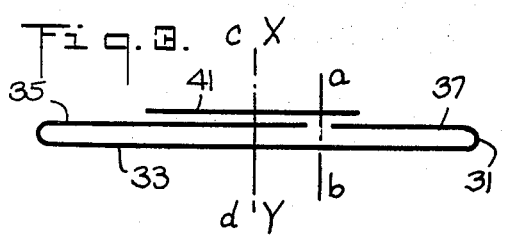
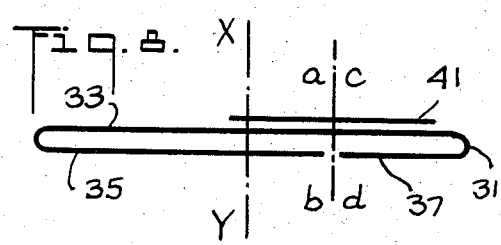
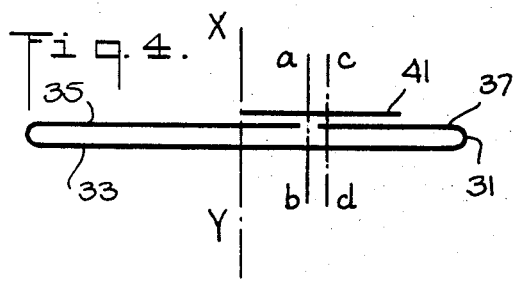
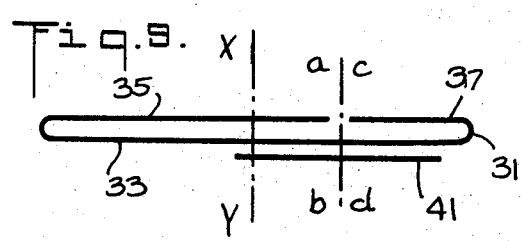
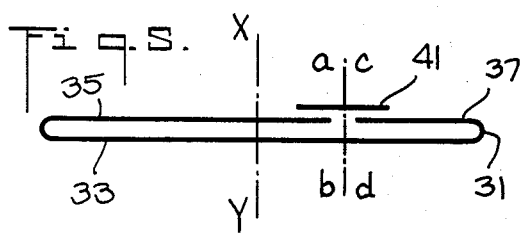
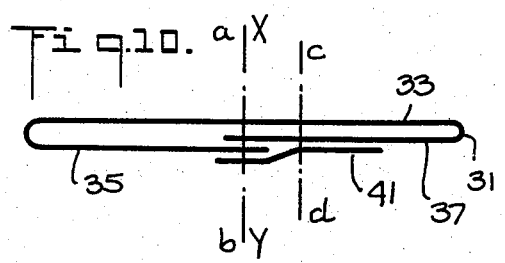
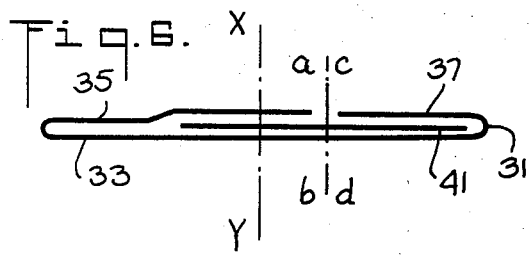
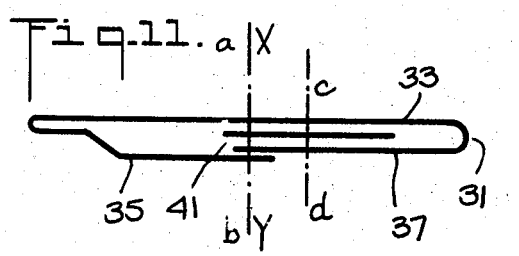
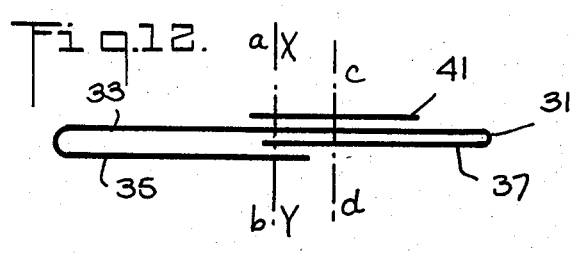

ASYMMETRIC PNEUMATIC VEHICLE TIRE

BACKGROUND OF THE INVENTION

This invention relates to belted pneumatic tires for vehicles and more particularly to such tires having asymmetric belts.

Pneumatic tires of the "radial ply" and "bias ply" types well known in the art are frequently constructed with a reinforcing band, commonly referred to as a breaker or belt, interposed between the crown region of the tire carcass and the tire tread for reinforcing the latter, the breaker or belt being comprised of one or more layers or plies of tire cords or cables which are generally inextensible, i.e., made of such material as metallic wires, glass fiber and textiles such as rayon, nylon, etc. In a mono-ply belt the cords or cables have a relatively low bias angle of 0°, i.e., they are oriented substantially parallel to the planes of the beads and to the median equatorial plane or crown centerline of the tire. If the belt is of a multi-ply construction, similar but opposed bias orientation of the cords or cables with respect to the median equatorial plane of the tire are employed in successive plies.

It is known that tires of the type mentioned above, i.e., tires having a tread reinforced by a belt or breaker composed of superposed, mutually crossed, rubberized plies of parallel, essentially inextensible cords or cables, frequently fail at high speeds because separations occur in the shoulder zones of the tires where the edges of the belt plies are located. Such ply separations are due to the cord ends at the edges of the belt plies becoming detached from the surrounding rubber under the effects of centrifugal force acting on the tire, and this result is made even more likely by the fact that the cords or cables in the belt plies, being disposed obliquely to the median equatorial plane of the tire by virtue of said plies being out obliquely with respect to said longitudinal direction of the cords or cables therein, have a natural tendency to spread apart or open in a fan-wise direction at their cut ends. The edges of the belt thus constitute zones or regions where the cut and free ends of the reinforcing elements, i.e., the cords or cables, by friction and by cutting, cause breaks both in the carcass plies and in the tread rubber of the tire.

Belted pneumatic tires of the type presently known in the art are further subject to the disadvantage that such tires are not always uniform. An effective lateral force on the tire may exist due to the reaction between the tire and the ground. This force, which is known as the lateral slip force, generally has two components, a force due to the structure of the tire itself which is commonly referred to as the force of structure and a force resulting from the geometry of the tire, commonly referred to as the force of conicity. The force of structure, for a given direction of rotation of the tire, is always directed in the same lateral direction relative to the tire's median equatorial plane irrespective of the direction of mounting of the tire on the wheel rim, because the direction of the force of structure is determined by the orientation or bias angle of the generally inextensible metal wires constituting the cord elements of the outermost reinforcing ply of the breaker or belt placed under the tread. The lateral force of conicity, which is the force with which this invention is concerned, may, on the other hand, be in either direction perpendicular to the median equatorial plane of the tire for a given direction of rotation, and the orientation of this force is a function of the direction of mounting of the tire on the wheel rim. This is because the force of conicity is due to the geometrical asymmetry of the tire and its direction is dependent on which side of the median equatorial plane of the tire the radially larger portion of the tire is located. A more detailed discussion regarding the cause of lateral slip force may be had by referring to U.S. Pat. No. RE 26,713, and a more complete exposition will therefore not here be provided. It is known that the total lateral slip force is an important factor in the cornering ability and steering stability of the vehicle on which such tires are mounted. Thus for example, if the sum of the lateral forces of the two tires mounted at the front of such a vehicle exceeds a certain value, the vehicle tends to pull to the right or to the left depending on the direction of the total lateral slip force, that is, the vehicle tends to over-steer or under-steer, thereby diminishing the controllability of the vehicle on which the tires are mounted.

SUMMARY OF THE INVENTION

It is, therefore an important object of the present invention to provide an improved asymmetric belted pneumatic tire construction by means of which the aforesaid drawbacks and disadvantages may be most efficaciously avoided.

It is a further object of this invention to provide an asymmetric belted pneumatic tire characterized by a high degree of resistance to belt-ply separation.

It is yet another object of this invention to provide a method of utilizing pairs of asymmetric belted pneumatic tires to reduce the force of conicity component of the lateral slip force.

According to the invention there is provided a pneumatic tire comprising a carcass, a tread overlying the crown region of the carcass and a reinforcing band interposed between the tread and the crown region of the carcass in circumferentially surrounding relation to the latter, the reinforcing band comprising a sheet of parallel ply cords, the sides of the sheet each folded inwardly, thereby defining a first transversely continuous circumferential layer, and a second circumferential layer, the latter formed by first and second portions and having a circumferential zone of discontinuity, the cords of the first layer forming a first angle of between about 10° and about 45° with the median equatorial plane of the tire and the cords of the second layer forming an angle supplementary to the first angle with the plane, and a circumferential covering ribbon of parallel ply cords positioned adjacent to the sheet and in the zone of discontinuity, the ribbon cords forming an angle of between about 5° and about 90° with the median equatorial plane, wherein the midpoint between the axis of the zone of discontinuity and the axis of the ribbon are offset from the median equatorial plane of the tire.

The foregoing and other objects and features of the present invention will be more clearly understood from the following detailed description thereof when read in conjunction with the accompanying drawings, in which:

BRIEF DESCRIPTION OF THE DRAWINGS

FIG. 1 is a cross-sectional schematic view of an asymmetrically belted pneumatic tire constructed in accordance with the invention;

FIGS. 2 through 12 illustrate schematic cross-sectional views of various alternative embodiments of an asymmetric belt constructed in accordance with the invention;

FIGS. 13 and 14 are cross-sectional plan views of the reinforcing band according to two alternative embodiments of the invention; and FIG. 15 is a schematic view illustrating a pair of asymmetric belted tires constructed according to the invention and indicating their mounting positions on a vehicle in order to reduce the force of conicity component of the lateral slip force.

DESCRIPTION OF THE PREFERRED EMBODIMENT

Referring now to FIG. 1 there is illustrated a schematic cross-sectional view of a tire 1 including a carcass 3 and a tread 5. For ease of illustration the carcass 3 has been illustrated as having a single radial ply 7. The invention is applicable however to both multiply radial carcass structures and bias ply carcass structures. Radial ply 7 terminates at its radially inwardmost edges in a pair of beads 9 and 11. Interposed between the crown region of the carcass and the tread is a reinforcing band including a folded belt 13 and a ribbon or strip 15, both of which extend circumferentially around the tire, the band being juxtaposed with both the carcass 3 and the tread 5.

As may be seen in FIG. 1, folded belt 13, which may advantageously be composed of a layer or sheet of rubberized parallel reinforcing elements, either metallic or textile, e.g., steel, rayon, glass fiber, nylon, Fiber B, polyester etc. is folded at its lateral edges to form a transversely continuous first layer 17 and a transversely discontinuous second layer composed or portions 19 and 21. In the embodiment here illustrated it is seen that portions 19 and 21 are arranged to lie between first layer 17 and tread 5 and to form a cicumferential zone of discontinuity, the axis of which coincides with the median equatorial plane of the tire indicated by the broken line $x-y$. As will be more fully discussed with regard to FIGS. 2 through 12, this particular arrangement is not mandatory, and is here provided for purposes of illustration only. Circumferential strip or ribbon 15, positioned radially outward of portions 19 and 21 may advantageously be composed of rubberized, parallel, reinforcing elements of the type discussed above with regard to folded belt 13, and is here illustrated as having its median circumferential axis, indicated by broken line $c-d$, offset from the aforementioned axis of the zone of discontinuity, thereby providing an asymmetrically constructed tire.

It is here appropriate to note that the midpoint of the zone of discontinuity, referred to above as the axis of the zone of discontinuity, and henceforth to be indicated by a broken line designated $a-b$, and the midpoit or axis of strip 15 indicated at $c-d$ may both be offset, in the same sense, from $x-y$, the median equatorial plane of the tire. Alternatively, one may be offset from $x-y$ while the other is coincident with $x-y$, this structure also providing the desired asymmetric belted tire. A plurality of modifications may be utilized to provide the desired asymmetry and some of these will be discussed below with regard to FIGS. 2 through 12.

Turning now to FIG. 2 there is illustrated a folded belt 31 of parallel ply cords having a continuous or main layer 33 and two portions or partial layers 35 and 37 which are turned upward and stopped some small distance from each other so as to form a gap discontinuity 39, the region or zone of said discontinuity having an axis $a-b$ coinciding with the median equatorial plane of the tire $x-y$. Strip 41 of parallel ply cords, however, has its axis $c-d$ offset from the median equatorial plane of the tire $x-y$ as well as from the axis of the zone of discontinuity $a-b$. It is here appropriate to note that in this figure, as well as in the subsequently to be discussed FIGS. 3 through 12, the upper part of the drawing is considered to be the side facing the tire tread while the lower portion of the drawing is considered to be the side facing the tire carcass.

Turning now to FIG. 3 there is illustrated another embodiment of the instant invention in which the circumferential midpoint or axis $c-d$ of strip 41 is coincident with the median equatorial plane $x-y$ of the tire, while the axis of the zone of discontinuity $a-b$ of folded belt 31 is offset from or eccentric to, said axes $c-d$ and $x-y$. It is here noted that, for purposes of simplicity, corresponding parts of FIGS. 2-12, wherever possible, have been, and will be, indicated by the same numerals or letters.

Turning now to FIG. 4 there is illustrated an embodiment of the instant invention in which both the axis of the zone of discontinuity of folded belt 31, $a-b$, and the axis of strip 41, $c-d$, are offset from or eccentric to the median equatorial plane of the tire, $x-y$, both axes being offset to the same side of said median equatorial plane.

Turning now to FIG. 5 there is illustrated a variant of the instant invention silimar to that illustrated in FIG. 4 except that, in this instance, the axis of the zone of discontinuity $a-b$, and the axis of strip 41, $c-d$, are not only offset to the same side of the median equatorial plane of the tire $x-y$, but they are, in addition, coincident.

Referring now to FIGS. 6 and 7, there are illustrated two embodiments of the instant invention in which both the axis $a-b$ of the zone of discontinuity and the axis $c-d$ of strip 41 coincide and are offset from the median equatorial plane of the tire $x-y$. In these embodiments however, each strip 41 is positioned between continuous layer 33 of folded belt 31 and the discontinuous layer of belt 31 which is composed of portions 35 and 37. It is thus clear that it is within the intended scope of this invention to provide reinforcing bands which include not only ribbons external to folded belt 31 but also ribbons which are internal thereto. The only requirement placed on ribbon position is that the ribbon lie in the zone of discontinuity so that the ribbon may provide the necessary structural strength to the reinforcing band. It will also be noted that it is within the contemplation of this invention to provide a folded belt 31 in which the discontinuous layer, composed of portions 35 and 37, may be either adjacent to the tread, as shown in FIG. 6, or adjacent to the carcass, as shown in FIG. 7.

Turning now to FIGS. 8 and 9, two further examples of possible ribbon position are illustrated. In each example the axis $a-b$ of strip 41 and the axis of the zone of discontinuity $c-d$ are coincident, both axes being eccentric to the median equatorial plane of the tire $x-y$, the ribbon 41 being located in both examples, external to folded belt 31 at the side of the belt opposite portions 35 and 37. FIG. 8 illustrates the fact, as did FIGS. 2-5, that ribbon 41 may be positioned adjacent to the tread, while FIG. 9 illustrates the fact that ribbon 41 may be positioned adjacent to the carcass. In either instance, ribbon 41 is positioned, in accordance with the previously noted requirement, to overlay the axis of the zone of discontinuity, thereby increasing the structural strength of the reinforcing band and therefore the structural strength of the tire.

Turning now to FIGS. 10-12 there are illustrated three further embodiments of the instant invention. It will be noted that in the embodiment illustrated in FIG. 2, the space, indicated at 39, provided between portions 35 and 37 was large enough that it could be termed a gap, whereas as in the subsequent Figures, i.e., FIGS. 3-9, the spacing between portions 35 and 37 was indicated to be substantially closer and could therefore be termed a simple joint. In each of the FIGS. 10-12 however, portions 35 and 37 form an overlapping joint, the overlapped area being the zone of discontinuity. The axis of the zone of discontinuity is, in each of the FIGS. 10-12, coincident with the median equatorial plane of the tire $x-y$. Ribbon 41 is illustrated in FIG. 10 as lying external to the overlapped joint and adjacent to the tire carcass, in FIG. 11 as lying between the first and second layers of folded belt 31, and in FIG. 12 as lying external to the overlapped joint and adjacent to the tire tread, while in each of the FIGS. 10-12 the ribbon 41 is illustrated as having its axis $c-d$ eccentric to, or offset from, its respective axes $a-b$ and $x-y$.

Although only a limited number of variations of zone of discontinuity positioning, in combination with a finite number of variations of ribbon positioning and joint types have been illustrated, it is to be understood that all combinations of the various structures illustrated are considered to be within the teaching of the instant invention.

Turning now to FIG. 13 there is illustrated a cross-sectional plan view of the instant reinforcing band. A sheet 50 of parallel ply cords 51 is folded at its edges 53 and 55 to form a main layer 57 which is transversely continuous and a transversely discontinuous layer formed by portions 59 and 61. The threads or cords of main layer 57 are illustrated as forming an angle $\alpha$ with the median equatorial plane of the tire $x-y$, and it is clear that, since portions 59 and 61 are folded at edges 53 and 55 respectively, the cords of portions 59 and 61 must form an angle which is supplementary to $\alpha$, i.e., $\pi-\alpha$. The angle $\alpha$ is advantageously selected to be between about 10° and about 45° and is here illustrated as 30°. Folded portions 59 and 61 form a simple joint 63, the projection of joint 63 in the inwardly and outwardly radial directions being the aforementioned zone of discontinuity, the axis of the zone being indicated at $a-b$. A strip or ribbon 65 which, as previously stated, is composed of a plurality of rubberized, parallel ply, textile cords overlays the zone of discontinuity. The rubberized textile cords 67 of the ribbon 65 form an angle $\beta$ with the median equatorial plane of the tire. The angle $\beta$ is here depicted, for ease of illustration, relative to the axis $a-b$ of the zone of discontinuity, this mode of illustration being permissable because the axis $a-b$ is always arranged to be parallel to the median equatorial plane $x-y$. The angle $\beta$ may be between about 5° and about 90°, and is here indicated as being 30°, and thus equal and opposite to the angle formed by the cords of portions 59 and 61 with the axis $x-y$. Referring now to FIG. 14, there is shown a cross-sectional plan view of another embodiment of the inventive reinforcing band which is identical to the band shown in FIG. 13 excepting that the ribbon 65 of FIG. 14 is arranged so that its cords are parallel to the cords of portions 59 and 61.

It has been found advantageous to dimensionally construct the reinforcing bands illustrated in FIGS. 13 and 14 so that continuous layer 57 has a width in the range between about two-thirds and slightly greater than the width of tread 5 of the tire, and ribbon 65 has a width in the range between about 20 percent and about 60 percent of the width of layer 57. It has further been found advantageous to set the eccentricity of either the axis $c-d$ of ribbon 65, or the axis $a-b$ of the zone of discontinuity, or both, to between about 1/12th and about ½ of the width of layer 57. If both the axis of the zone of discontinuity and the axis of ribbon 65 are offset from the median equatorial plane $x-y$, and they are not coincident, then the eccentricity above referred to which is also the eccentricity of the tire is said to be the distance between the median equatorial plane of the tire and the midpoint between the axes $a-b$ and $c-d$.

Referring now to FIG. 15 there is illustrated a pair of tires 71 and 73 mounted on a common axle 74, the tires 71 and 73 being the left and right tires respectively of a vehicle moving in the direction indicated by arrow 75, i.e., arrow 77 indicates the direction of rotation of the tires. Tires 71 and 73 are constructed with asymmetric reinforcing bands according to the invention and it is the asymmetry of the bands which causes the eccentricity of the tires, this eccentricity being indicated by broken lines 79 and 81 respectively which are offset from the median equatorial planes $x-y$ of their respective tires. As previously stated, the direction of the force of conicity of a tire is determined by the geometrical asymmetry of the tire, and arrows 85 and 87 indicate the direction of the force of conicity of tires 71 and 73 respectively. FIG. 15 thus illustrates the fact that it is desirable to mount pairs of asymmetrically belted tires constructed according to the invention on a vehicle so that the eccentricity of each tire is outboard of the vehicle because this insures that the forces of conicity of both tires will oppose each other, i.e., be inwardly directed as indicated by arrows 85 and 87. The opposition of the forces of conicity of the two tires in this manner provides for the reduction, if not the total elimination, of the force of conicity component of the lateral slip force, and results in improved handling of the vehicle when it is driven both in a straight path and on curves.

It is thus seen that there has been described a tire construction and a method for using such a tire which will provide immunity to ply separation, especially during high speed service, and a method of utilizing such tires in pairs so that the force of conicity portion of the lateral slip force may be reduced, if not completely eliminated.

Although the foregoing description and illustrations have referred only to a single reinforcing band it will be clear that a plurality of reinforcing bands and/or a plurality of ribbons or strips may be used rather than a single reinforcing band. Further, it will be understood that although the instant tire has been illustrated with the various layers indicated by single lines and spaced from one another, for purposes of greater clarity, in actuality each layer is in contact with the immediately adjacent layers and in a condition of reciprocal adhesion.

It will be understood that the foregoing description of the preferred embodiments of the present invention is for purposes of illustration only and that the various structural and operational features as herein disclosed and susceptible to a number of modifications and changes, none of which entail any departure from the spirit and scope of the present invention as defined by the appended claims.

What is claimed:

1. A pneumatic tire comprising a carcass, a tread overlying the crown region of said carcass, and a tread reinforcing band interposed between the tread and said crown region of said carcass in circumferentially surrounding relation to the latter, said reinforcing band comprising:

a sheet of parallel ply cords, the sides of said sheet each folded inwardly, thereby defining a first transversely continuous circumferential layer and a second circumferential layer, the latter formed by first and second portions and having a circumferential zone of discontinuity, the cords of said first layer forming a first angle of between about 10° and about 45° with the median equatorial plane of the tire and the cords of the second layer forming an angle supplementary to said first angle with said plane; and a circumferential ribbon of parallel ply cords positioned adjacent to said sheet and lying in said zone of discontinuity, said ribbon cords forming an angle of between about 5° and about 90° with said median equatorial plane, wherein the axis of said ribbon and the midpoint between the axis of said zone of discontinuity and the axis of said ribbon are both offset from the median equatorial plane of the tire.

2. A pneumatic tire according to claim 1, wherein the axis of said zone of discontinuity is coincident with the median equatorial plane of the tire.

3. A pneumatic tire according to claim 1, wherein the axis of said zone of discontinuity is off-set from said median equatorial plane.

4. A pneumatic tire according to claim 1, wherein both the axis of the zone of discontinuity and the axis of said ribbon are off-set from said median equatorial plane and both said axes are coincident.

5. A pneumatic tire according to claim 1, wherein the axis of said zone of discontinuity and the axis of said ribbon are off-set from said equatorial plane of the tire by unequal amounts and both said axes are on the same side of said median equatorial plane.

6. A pneumatic tire according to claim 1, wherein said ribbon is positioned adjacent to said second layer.

7. A pneumatic tire according to claim 1, wherein said ribbon is positioned adjacent to said first layer.

8. A pneumatic tire according to claim 1, wherein said ribbon is interposed between said first and second layers.

9. A pneumatic tire according to claim 1, wherein the width of said ribbon is between about 20 percent and about 60 percent of the width of said first layer.

10. A pneumatic tire according to claim 1, wherein the midpoint between the axis of said zone of discontinuity and the axis of said ribbon is off-set from said median equatorial plane by between about 1/12 and ½ of the width of said first layer.

11. A pneumatic tire according to claim 1, wherein the cords of said first layer and the cords of said ribbon both form an angle of approximately 30° with said median equatorial plane.

* * * * *